United States Patent
Chaiken et al.

(10) Patent No.: US 11,907,052 B2
(45) Date of Patent: Feb. 20, 2024

(54) SYSTEMS AND METHODS FOR ENCRYPTING UNIQUE FAILURE CODES TO AID IN PREVENTING FRAUDULENT EXCHANGES OF INFORMATION HANDLING SYSTEM COMPONENTS

(71) Applicant: Dell Products L.P., Round Rock, TX (US)

(72) Inventors: Craig L. Chaiken, Pflugerville, TX (US); Adolfo S. Montero, Pflugerville, TX (US); Geroncio O. Tan, Austin, TX (US); Hong-Ji Huang, Hsinchu (TW); Yi-Fan Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 16/853,109

(22) Filed: Apr. 20, 2020

(65) Prior Publication Data
US 2021/0326198 A1  Oct. 21, 2021

(51) Int. Cl.
*G06F 11/00* (2006.01)
*G06F 11/07* (2006.01)
*G06F 21/60* (2013.01)

(52) U.S. Cl.
CPC ...... *G06F 11/0769* (2013.01); *G06F 11/0751* (2013.01); *G06F 21/602* (2013.01)

(58) Field of Classification Search
CPC ............. G06F 11/0751; G06F 11/0769; G06F 11/1417
See application file for complete search history.

(56) References Cited

U.S. PATENT DOCUMENTS

| | | | | |
|---|---|---|---|---|
| 7,685,477 B2* | 3/2010 | Sauber | ............ | G06F 11/327 714/57 |
| 9,471,412 B2* | 10/2016 | Harden | ............ | G06F 11/0772 |
| 10,120,743 B2* | 11/2018 | Joshi | ............ | G06F 11/0706 |
| 10,572,363 B2* | 2/2020 | Klein | ............ | H04L 41/22 |
| 2013/0346837 A1* | 12/2013 | Mitsuhashi | ............ | H04L 1/0061 714/807 |
| 2014/0082430 A1* | 3/2014 | Bartlett | ............ | G06F 11/0709 714/47.3 |
| 2016/0041866 A1* | 2/2016 | Oleynikov | ............ | G06F 16/24575 714/15 |
| 2017/0199777 A1* | 7/2017 | Shah | ............ | G06F 21/10 |
| 2018/0074884 A1* | 3/2018 | Cady | ............ | G06F 11/0787 |
| 2019/0258542 A1* | 8/2019 | Chaiken | ............ | G06F 21/572 |

(Continued)

OTHER PUBLICATIONS

Greenamyer, Paul; Hashing vs encryption vs salting: what's the difference?, Sep. 22, 2020, https://cybernews.com/security/hashing-vs-encryption/.

*Primary Examiner* — Elmira Mehrmanesh
(74) *Attorney, Agent, or Firm* — Jackson Walker L.L.P.

(57) ABSTRACT

An information handling system may include a processor, a display device communicatively coupled to the processor, and a management controller communicatively coupled to the processor and the display device and configured to, in response to a failure of the information handling system, determine a component of the information handling system as a source of failure, generate a unique failure code associated with the failure, encrypt the unique failure code to generate an encrypted unique failure code, and display the encrypted unique failure code to the display device.

21 Claims, 2 Drawing Sheets

(56) References Cited

U.S. PATENT DOCUMENTS

| | | | |
|---|---|---|---|
| 2020/0036511 A1* | 1/2020 | Cheon | H04L 63/0428 |
| 2020/0327005 A1* | 10/2020 | Singh | G06F 11/3065 |
| 2021/0365566 A1* | 11/2021 | Souissi | G11C 29/04 |

* cited by examiner

SYSTEMS AND METHODS FOR ENCRYPTING UNIQUE FAILURE CODES TO AID IN PREVENTING FRAUDULENT EXCHANGES OF INFORMATION HANDLING SYSTEM COMPONENTS

TECHNICAL FIELD

The present disclosure relates in general to information handling systems, and more particularly to updating of firmware of storage resources in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling system before video is available to a user (e.g., as may occur as a result of memory failures, motherboard failures, and/or processor failures), feedback to the user regarding the failure has traditionally been limited to light-emitting diode (LED) blink codes or audible tones (e.g., "beeps") played through a speaker coupled to the information handling system. Reporting errors with these mechanisms is primarily limited by the minimalistic amount of information that can be conveyed to the user with LED blink codes and/or audible tones. This minimalistic approach is typically a numeric representation of an error code that must be looked up in a table to diagnose the failure. A limitation from only being able to convey very few digits of an error code via these existing techniques is that there is no practical way to add extra cryptographic information to validate that the error code being reported to product support is legitimate (i.e., original hardware purchased with the system) and not an attempt by an unscrupulous user to obtain free updated hardware. Accordingly, systems and methods are desired to more reduce the occurrence of fraudulently returned parts.

SUMMARY

In accordance with the teachings of the present disclosure, the disadvantages and problems associated with updating firmware of storage resources may be reduced or eliminated.

In accordance with embodiments of the present disclosure, an information handling system may include a processor, a display device communicatively coupled to the processor, and a management controller communicatively coupled to the processor and the display device and configured to, in response to a failure of the information handling system, determine a component of the information handling system as a source of failure, generate a unique failure code associated with the failure, encrypt the unique failure code to generate an encrypted unique failure code, and display the encrypted unique failure code to the display device.

In accordance with these and embodiments of the present disclosure, a method may include determining a component of an information handling system as a source of failure of the information handling system, generating a unique failure code associated with the failure, encrypting the unique failure code to generate an encrypted unique failure code, and displaying the encrypted unique failure code to a display device of the information handling system.

In accordance with these and embodiments of the present disclosure, an article of manufacture may include a non-transitory computer readable medium and computer-executable instructions carried on the computer readable medium, the instructions readable by a management controller of an information handling system, the instructions, when read and executed, for causing the management controller to: determine a component of the information handling system as a source of failure of the information handling system, generate a unique failure code associated with the failure, encrypt the unique failure code to generate an encrypted unique failure code, and display the encrypted unique failure code to a display device of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
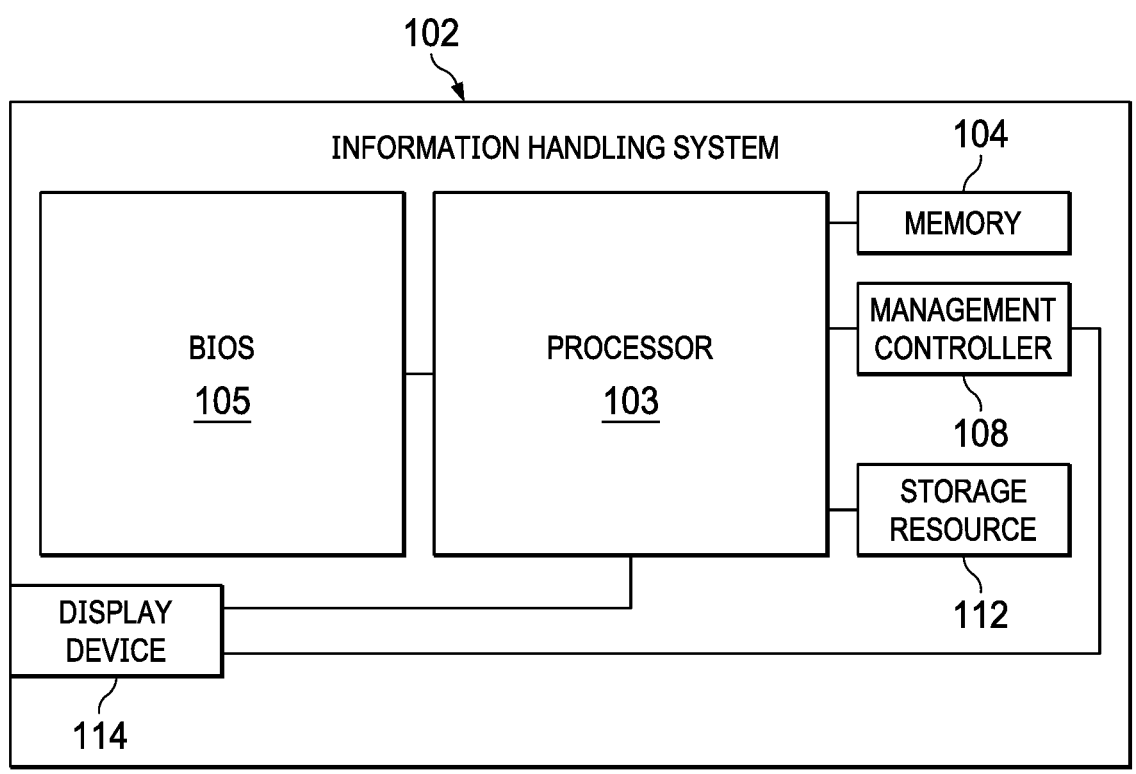
FIG. 1 illustrates a block diagram of an example information handling system, in accordance with embodiments of the present disclosure.
Figure 2:
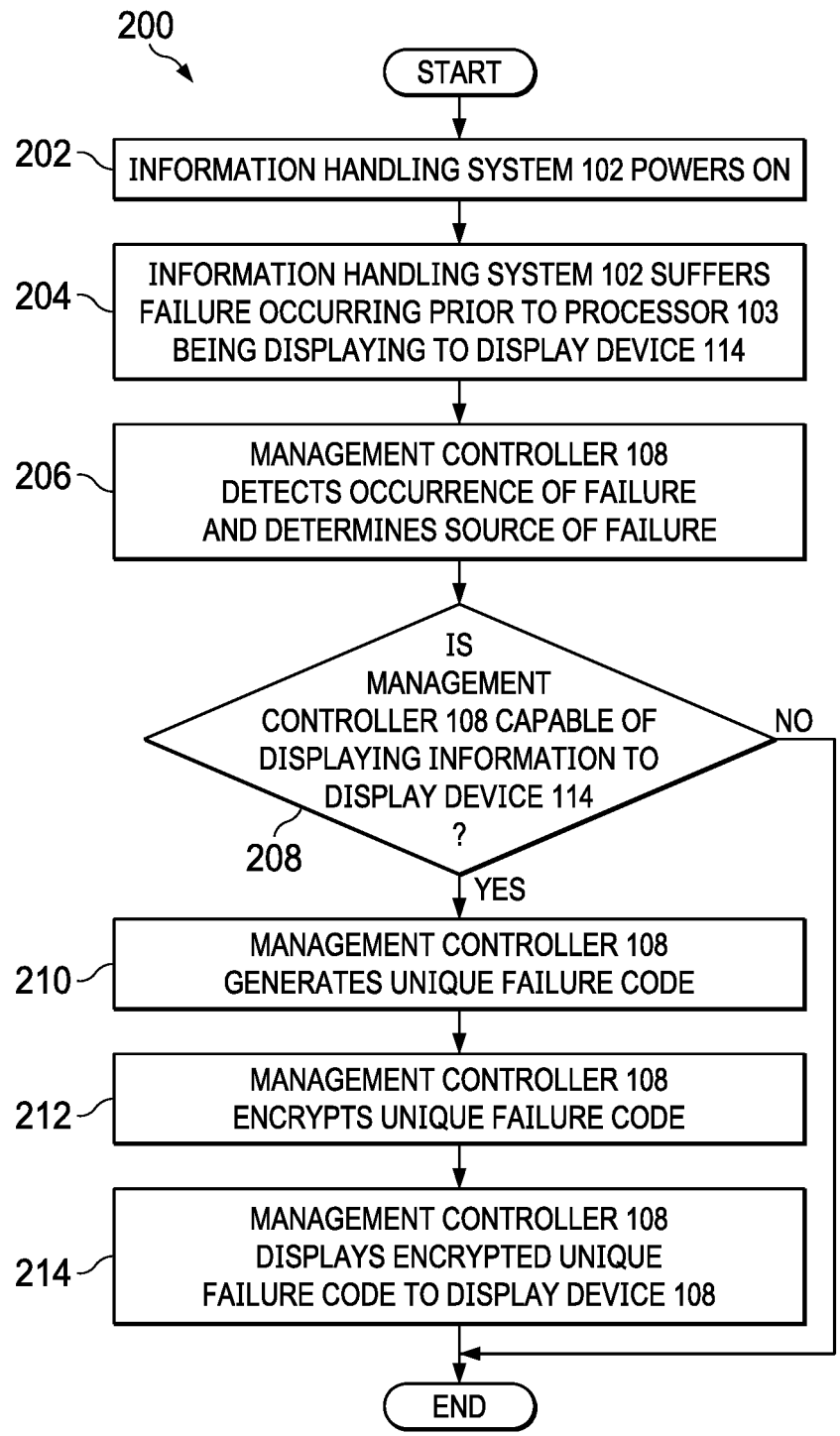
FIG. 2 illustrates a flow chart of an example method for preventing fraudulent exchange of replaceable components of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example information handling system 102, in accordance with embodiments of the present disclosure. In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a management controller 108 communicatively coupled to processor 103, a storage resource 112 coupled to processor 103, and a display device 114 communicatively coupled to processor 103 and management controller 108.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 105, storage resource 112, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 108 may be configured to provide out-of-band management facilities for management of information handling system 102. Such management may be made by management controller 108 even if information handling system 102 is powered off or powered to a standby state. Management controller 108 may include any suitable components for carrying out its functionality, including without limitation a processor, memory, and an out-of-band network interface separate from and physically isolated from an in-band network interface of information handling system 102. In certain embodiments, management controller 108 may include or may be an integral part of a baseboard management controller (BMC), a remote access controller (e.g., a Dell Remote Access Controller or Integrated Dell Remote Access Controller), or an enclosure controller. In other embodiments, management controller 108 may include or may be an integral part of a chassis management controller (CMC). As described in more detail below, management controller 108 may be configured to, in the event of a failure of information handling system 102 (e.g., a failure that prevents information handling system 102 from booting to an operating system), determine a cause of failure, generate a unique failure code associated with the failure, encrypt the unique failure code, and display such encrypted unique failure code to a user. The user may communicate the encrypted unique failure code to a provider (e.g., manufacturer, vendor, etc.) of information handling system 102, who may decrypt the encrypted unique failure code and verify that the unique failure code matches records associated with the user.

Storage resource 112 may a include hard disk drive, a magnetic tape library, an optical disk drive, a magneto-optical disk drive, a compact disk drive, a compact disk array, a disk array controller, a Non-Volatile Memory Express (NMVe) storage resource, and/or any other system, apparatus or device operable to store media. As shown in FIG. 1, storage resource 112 may be "directly" coupled to processor 103 (e.g., via a PCIe bus root port). However, in some embodiments, storage resource 112 may be coupled to processor 103 via a storage controller or other storage interface.

Display device 114 may include any system, device, or apparatus configured to generate graphical images and/or reproduce alphanumeric text for viewing by a user of information handling system 102, based on display data communicated to display device 114 from processor 103 and/or management controller 108. Display device 114 may comprise a light-emitting diode display, liquid crystal display, and/or any other suitable display.

In addition to processor 103, memory 104, BIOS 105, management controller 108, storage resource 112, and display device 114, information handling system 102 may include one or more other information handling resources.

FIG. 2 illustrates a flow chart of an example method 200 for preventing fraudulent exchange of replaceable components of information handling system 102, in accordance with embodiments of the present disclosure. According to certain embodiments, method 200 may begin at step 202. As noted above, teachings of the present disclosure may be implemented in a variety of configurations of system 100 as shown in FIG. 1. As such, the preferred initialization point for method 200 and the order of the steps comprising method 200 may depend on the implementation chosen.

At step 202, information handling system 102 may power on. However, at step 204, information handling system 102 may suffer a failure that occurs prior to BIOS 105 initializing processor 103 to the point at which processor 103 is capable of displaying information to display device 114, for example a failure of processor 103, memory 104, or a motherboard of information handling system 102.

At step 206, management controller 108 may detect the occurrence of the failure and determine the source of the failure. For example, in some embodiments, management controller 108 may determine that a memory training sequence of memory 104 failed to complete. As a further example, in these and other embodiments, management controller 108 may detect the source of the failure locally, such as a power sequencing failure, or from early operation of BIOS 105, such as a memory reference code failure associated with memory 104 (e.g., failure to read Serial Presence Detect configuration data).

At step 208, management controller 108 may determine if it is capable of displaying information to display device 114, given that the failure has prevented processor 103 from displaying information to display device 114. For example, management controller 108 may be equipped with functionality as described in U.S. application Ser. No. 16/530,171 filed Aug. 2, 2019, which may enable management controller 108 to display simple text messages on display device 114 prior to boot of BIOS 105. If management controller 108 is capable of displaying information to display device 114, method 200 may proceed to step 210. Otherwise, method 200 may end.

At step 210, responsive to determining that management controller 108 is capable of displaying information to display device 114, management controller 108 may generate a unique failure code. Such unique failure code may be based on the type of failure that occurred as well as uniquely identifying information (e.g., serial number) regarding the failed component and/or uniquely identifying information (e.g., service tag number) of information handling system 102. For example, in some embodiments, the unique failure code may include a concatenation of a serial number regarding the failed component and a service tag of information handling system 102.

At step 212, management controller 108 may, for example using a private key embedded within a cryptographic processor or other cryptographic function of management controller 108, encrypt the unique failure code.

At step 214, management controller 108 may display the encrypted unique failure code to display device 108. At step 214, method 200 may end.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other suitable system operable to implement method 200. In certain embodiments, method 200 may be implemented partially or fully in software and/or firmware embodied in computer-readable media.

Using the encrypted unique failure code displayed to display device 114, a user may communicate such encrypted unique failure code to a provider of information handling system 102 (e.g., via a customer support hotline or other suitable mode of communication). The provider may in turn decrypt the encrypted unique failure code (e.g., using a public key associated with a private key used to create the encrypted unique failure code), and verify that the identifying information from the unique failure code, as decrypted, matches records associated with information handling system 102 and the purported failed component. If the failure is verified from the unique failure code, the provider may then issue a replacement component to remedy the failure.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a display device communicatively coupled to the processor; and
   a management controller communicatively coupled to the processor and the display device and configured to, in response to a failure of the information handling system:
      determine a component of the information handling system as a source of failure;
      generate a unique failure code associated with the failure;
      encrypt the unique failure code to generate an encrypted unique failure code; and
      display the encrypted unique failure code to the display device;
      wherein the encrypted unique failure code is capable of being decrypted to match identifying information associated with the decrypted unique failure with records associated with the information handling system and the component determined as the source of failure.

2. The information handling system of claim 1, wherein the failure occurs during a boot of the information handling system preventing the processor from displaying information to the display device.

3. The information handling system of claim 2, wherein the management controller is further configured to determine if the management controller is capable of displaying information to the display device when the processor is prevented from displaying information to the display device.

4. The information handling system of claim 1, wherein generating the unique failure code associated with the failure comprises generating the unique failure code based on unique identifying information of the component that failed.

5. The information handling system of claim 4, wherein generating the unique failure code associated with the failure further comprises generating the unique failure code based on unique identifying information of the information handling system.

6. The information handling system of claim 1, wherein encrypting the unique failure code comprises encrypting the unique failure code using a private key embedded within the management controller.

7. The information handling system of claim 1, wherein the unique failure code associated with the failure indicates uniquely identifying information of an information handling resource of the information handling system.

8. A method comprising:
   determining a component of an information handling system as a source of failure of the information handling system;
   generating a unique failure code associated with the failure;
   encrypting the unique failure code to generate an encrypted unique failure code; and
   displaying the encrypted unique failure code to a display device of the information handling system;
   wherein the encrypted unique failure code is capable of being decrypted to match identifying information associated with the decrypted unique failure code with records associated with the information handling system and the component determined as the source of failure.

9. The method of claim 8, wherein the failure occurs during a boot of the information handling system preventing the processor from displaying information to the display device.

10. The method of claim 9, wherein:
    the determining, generating, encrypting, and displaying steps are performed by a management controller of the information handling system; and
    the method further comprises determining if the management controller is capable of displaying information to the display device when the processor is prevented from displaying information to the display device.

11. The method of claim 8, wherein generating the unique failure code associated with the failure comprises generating the unique failure code based on unique identifying information of the component that failed.

12. The method of claim 11, wherein generating the unique failure code associated with the failure further comprises generating the unique failure code based on unique identifying information of the information handling system.

13. The method of claim 8, wherein encrypting the unique failure code comprises encrypting the unique failure code using a private key embedded within the management controller.

14. The method of claim 8, wherein the unique failure code associated with the failure indicates uniquely identifying information of an information handling resource of the information handling system.

15. An article of manufacture comprising:
a non-transitory computer readable medium; and
computer-executable instructions carried on the computer readable medium, the instructions readable by a management controller of an information handling system, the instructions, when read and executed, for causing the management controller to:
determine a component of the information handling system as a source of failure of the information handling system;
generate a unique failure code associated with the failure;
encrypt the unique failure code to generate an encrypted unique failure code; and
display the encrypted unique failure code to a display device of the information handling system;
wherein the encrypted unique failure code is capable of being decrypted to match identifying information associated with the decrypted unique failure code with records associated with the information handling system and the component determined as the source of failure.

16. The article of claim 15, wherein the failure occurs during a boot of the information handling system preventing the processor from displaying information to the display device.

17. The article of claim 16, wherein the instructions are further for causing the management controller to determine if the management controller is capable of displaying information to the display device when the processor is prevented from displaying information to the display device.

18. The article of claim 15, wherein generating the unique failure code associated with the failure comprises generating the unique failure code based on unique identifying information of the component that failed.

19. The article of claim 18, wherein generating the unique failure code associated with the failure further comprises generating the unique failure code based on unique identifying information of the information handling system.

20. The article of claim 15, wherein encrypting the unique failure code comprises encrypting the unique failure code using a private key embedded within the management controller.

21. The article of claim 15, wherein the unique failure code associated with the failure indicates uniquely identifying information of an information handling resource of the information handling system.

* * * * *